S. H. LA RUE.

Heating Stove.

No. 4,175. Reissued Nov. 8, 1870.

Witnesses.
T. T. Campbell.
J. N. Campbell.

Inventor
Silas Hoffman La Rue
by his Attys
Mason Fenwick & Lawrence

N. PETERS, Photo-Lithographer, Washington, D. C.

United States Patent Office.

SILAS HOFFMAN LA RUE, OF ALLENTOWN, PENNSYLVANIA.

Letters Patent No. 105,816, dated July 26, 1870; reissue No. 4,175, dated November 8, 1870.

IMPROVEMENT IN HEATING-STOVES.

The Schedule referred to in these Letters Patent and making part of the same.

*To all whom it may concern:*

Be it known that I, SILAS HOFFMAN LA RUE, of Allentown, in the county of Lehigh and State of Pennsylvania, have invented certain new and useful Improvements on Supply-Reservoir Stoves; and I do hereby declare that the following is a full, clear, and exact description thereof, reference being had to the accompanying drawing making part of this specification, in which—

Similar letters of reference indicate corresponding parts in the several figures.

Figure 1:
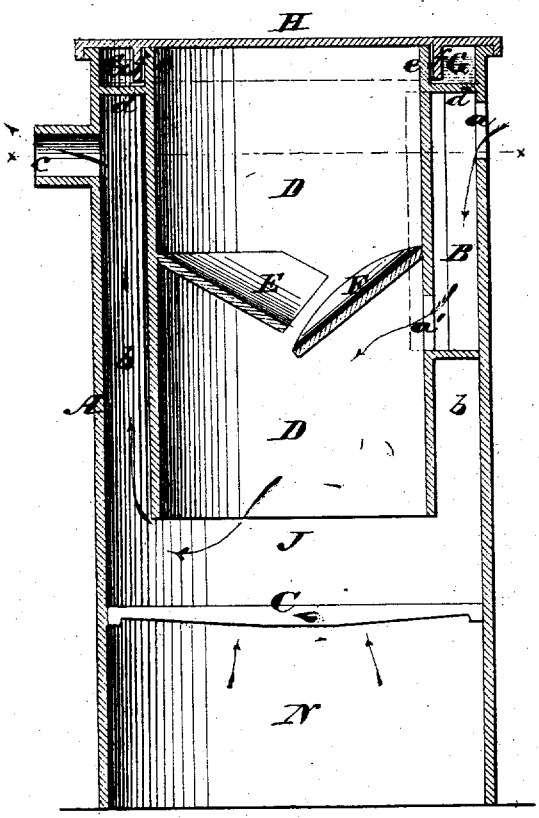
Figure 1 is a diametrical section through a cylindrical stove having my invention applied to it.
Figure 2:
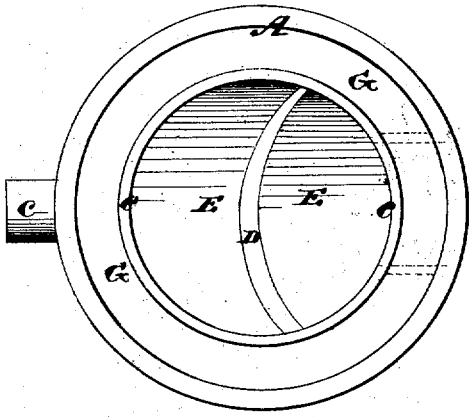
Figure 2 is a top view of the stove with the cover removed.
Figure 3:
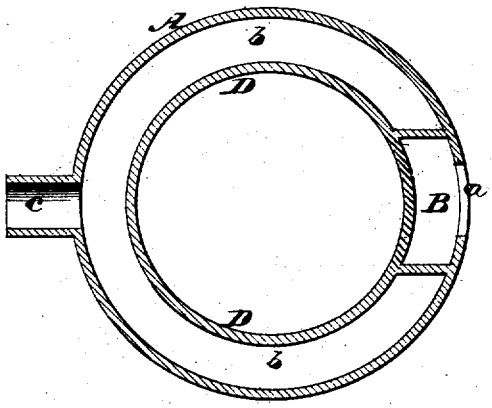
Figure 3 is a section through the stove, taken in a horizontal plane, indicated by dotted line *x x* in fig. 1.

This invention relates to improvements of that class of stoves wherein a fuel-reservoir is arranged above the grate or fire-pot for containing a large quantity of fuel, and supplying the place of the burning fuel as fast as the latter burns away at the base of the reservoir.

The nature of my invention consists—

First, in providing a passage for the supply of air into the fuel-reservoir, above the lower end of the same, in addition to the ordinary upward supply of air through the grate, whereby the fuel in the lower part of the reservoir will be subjected to slow process of distillation previous to its descent into the fire-chamber below the reservoir, the gases thus evolved being drawn down through the incandescent fuel and burned, as will be hereinafter explained.

Second, in the arrangement of deflectors or contractors within the fuel-reservoir, and above its air-inlet passage, for the purpose of forming a contracted throat, which will prevent the fuel above it from ignition, as will be hereinafter explained.

Third, in combination of a water-packed cover with a fuel-magazine having an air-inlet passage above its lower end, whereby the supply of air through the top of the reservoir is effectually prevented, as will be hereinafter explained.

Fourth, in an air-inlet conduit, extending from a point near the top of the stove to a point above the lower end of the fuel-magazine, whereby the air will be warmed on its way into the magazine, as will be hereinafter explained.

To enable others skilled in the art to understand my invention, I will describe its construction and operation.

The heating-stove which I have represented in the accompanying drawing is the simplest form of stove which can be made, consisting of an external cylinder, A, provided with a grate, C, a fuel-magazine, D, and a cover, H.

The fuel-magazine may be of a cylindrical kind, as shown, and it may be suspended within the case A in any suitable manner.

It is supplied with fuel through its upper end, which latter is provided with a flanged cover, H, the inner annular flange *f* of which is received into an annular tank, G, containing water.

This tank may be constructed in any suitable manner, but that shown in the drawing is formed between the upper end *e* of the magazine D and the case A, by the horizontal diapnragm *d*.

This mode of applying the cover H forms a water-packed joint, and prevents the entrance of air into the upper end of the magazine. It is also a more perfect joint for the purpose intended than could be practically obtained in any other way, and it affords an evaporation at the top of the stove, a feature which should accompany every stove for warming purposes.

At a point which is above the lower end of the fuel-reservoir D is an opening, *a'*, which communicates with the external air through a conduit, B, and inlet-passage *a*.

The inlet-passage *a* is located near the top of the stove, and the conduit B is arranged in the space *b*, between the reservoir and the case A Thus it will be seen that heated air will be conducted directly into the reservoir above its lower end.

Above the opening *a'* the reservoir is contracted by means of inclined plates E E, which direct the inflowing current of air downward, and thus prevent the fuel which is above them from ignition. The reservoir may be contracted in any other suitable manner.

*Operation.*

Fire having been kindled on the grate C by the ordinary draught from the ash-pit N, up through the grate and out through the escape-flue *c*, the cover H is removed, the tank G supplied with water, and the reservoir D filled with coal.

The cover H is then replaced to prevent the entrance of air into the top of the reservoir.

Air will now enter the reservoir through the descending passage B, and in a short time the fuel in the reservoir which is below the contractors E E will become ignited, and the lower end of the reservoir will become red hot.

It will be seen that all the products resulting from distillation and combustion in the reservoir will be compelled to descend through a large body of incandescent fuel on the grate; consequently a complete combustion and utilization of the products will result.

The fuel which is "coked" or not completely burned in the reservoir will descend into the open fire-chamber J, and be again subjected to a heating and burning process by the supply of air through the grate from below.

Having described my invention,

What I claim as new. and desire to secure by Letters Patent, is—

1. The fuel-reservoir D, provided with an air-inlet passage above its lower end, surrounded by an ascending draught-passage, *b*, and arranged over a fire-chamber, J, so as to be free from the grate C, substantially as described.

2. The contractors E, or the equivalent thereof, arranged in a reservoir, D, above the air-passage leading therein, substantially as described.

3. The combination of a water-packed cover, H, with a fuel-reservoir, into which air is admitted, substantially as described.

4. The descending air-conduit B, leading into the fuel-magazine, above the lower end thereof, and arranged in the ascending draught-space *b*, in combination with a grate, C, which is arranged below and free from the magazine, substantially as described.

5. A fuel-reservoir stove, in which air is admitted to a fire-chamber, J, through the grate, in combination with an air-inlet passage leading from without the stove into the fuel-reservoir at a point which is above the lower end thereof, whereby the products resulting from combustion in the reservoir are reheated after leaving the latter, substantially as described.

Witnesses: SILAS HOFFMAN LA RUE.

K. WITTMAN,

E. BURKHALTER.